United States Patent
Harmon et al.

(10) Patent No.: US 7,420,353 B2
(45) Date of Patent: Sep. 2, 2008

(54) METHOD AND SYSTEM FOR COMMUNICATING VOLTAGE REGULATOR SWITCHING INFORMATION TO A VEHICLE COMPUTER

(75) Inventors: Jack D. Harmon, Carmel, IN (US); Mingshe Zhou, Norman, OK (US); Jim Phillips, Mustang, OK (US)

(73) Assignee: Remy International, Inc., Anderson, IN (US)

( * ) Notice: Subject to any disclaimer, the term of this patent is extended or adjusted under 35 U.S.C. 154(b) by 124 days.

(21) Appl. No.: 11/539,418

(22) Filed: Oct. 6, 2006

(65) Prior Publication Data

US 2008/0084190 A1    Apr. 10, 2008

(51) Int. Cl.
*H02P 9/00* (2006.01)
*H02H 7/06* (2006.01)

(52) U.S. Cl. .......................................... 322/28; 322/25

(58) Field of Classification Search .................... 322/22, 322/23, 24, 25, 28, 37
See application file for complete search history.

(56) References Cited

U.S. PATENT DOCUMENTS

| | | | |
|---|---|---|---|
| 4,682,044 A * | 7/1987 | Hotate et al. .............. | 290/40 B |
| 5,629,606 A * | 5/1997 | Asada ......................... | 322/28 |
| 5,966,001 A * | 10/1999 | Maehara et al. ............... | 322/28 |
| RE37,609 E | 3/2002 | Bittner | |
| 6,462,517 B2 | 10/2002 | Asada | |
| 6,664,767 B2 | 12/2003 | Takahashi et al. | |
| 6,737,835 B2 * | 5/2004 | Taniguchi .................... | 322/29 |
| 6,815,933 B2 * | 11/2004 | Taniguchi et al. ............. | 322/28 |
| 7,075,272 B2 * | 7/2006 | Sasaki et al. .................. | 322/28 |
| 7,078,881 B2 * | 7/2006 | Aoyama ...................... | 322/28 |
| 7,235,952 B2 * | 6/2007 | Maehara ...................... | 322/24 |
| 2004/0108840 A1 | 6/2004 | Morrissette | |
| 2006/0043955 A1 | 3/2006 | Hung | |

\* cited by examiner

*Primary Examiner*—Nicholas Ponomarenko
(74) *Attorney, Agent, or Firm*—Cantor Colburn LLP

(57) ABSTRACT

A method for communicating voltage regulator switching information to a vehicle computer includes generating a first output signal from a voltage regulator, the first output signal configured to regulate a field current of a generating device associated therewith. A second output signal is generated from the voltage regulator, the second output signal communicated to the vehicle computer, the second output signal further indicative of the state of the first output signal. The second output signal represents an average value of the first output signal, having transient values included within the first output signal filtered therefrom.

20 Claims, 3 Drawing Sheets

METHOD AND SYSTEM FOR COMMUNICATING VOLTAGE REGULATOR SWITCHING INFORMATION TO A VEHICLE COMPUTER

BACKGROUND

The present invention relates generally to rotating electric machinery and, more particularly, to a method and system for communicating voltage regulator switching information to a vehicle computer.

Generators are found in virtually every motor vehicle manufactured today. These generators, also referred to as alternators, produce electricity necessary to power a vehicle's electrical accessories, as well as to charge a vehicle's battery. Generators must also provide the capability to produce electricity in sufficient quantities so to power a vehicle's electrical system in a manner that is compatible with the vehicle's electrical components. The alternator or generator typically uses a voltage regulator to regulate the charging voltage and output current in order to provide consistent operation during varying loads that would otherwise create voltage drops and other operational problems. Presently, conventional vehicle charging systems may utilize a voltage regulator having either a discrete transistor or, alternatively, a custom integrated circuit known as an Application Specific Integrated Circuit (ASIC).

Still other vehicle designs may also employ voltage regulators with advanced microprocessor functions that maintain a highly accurate regulated voltage produced by a generator. Microprocessor based regulators may also include advanced clock and memory circuits that store battery and power supply reference data, battery voltage and generator rotation speed, as well determine how much the battery is being charged and at what rate at any point in time.

Notwithstanding the particular type of regulator design (e.g., discrete components, ASIC, microprocessor), the regulator typically provides a pulse width modulation (PWM) signal to be applied to a switching device that selectively passes current through a field coil of the alternator. By varying the duty cycle of the PWM signal, the amount of current can be increased or decreased, thereby increasing or decreasing the output voltage of the alternator. In modern vehicles, an electronic control module (ECM) serves as the main vehicle computer, and thus is in communication with the voltage regulator. However, it may be the case that the ECM is incompatible with the PWM signal that is applied to the driver of the power switching device. That is, an actual PWM signal may include several transient depending on the addition/subtraction of electrical loads to the system, instead of a smooth, average PWM signal. In such a case, conventional systems may require the use of additional (and expensive) components to filter the true PWM signal for communication to the ECM.

Accordingly, it would be desirable to be able to communicate PWM switching information to a vehicle computer in a manner that overcomes the above mentioned disadvantages.

SUMMARY

The foregoing discussed drawbacks and deficiencies of the prior art are overcome or alleviated by, in an exemplary embodiment, a method for communicating voltage regulator switching information to a vehicle computer, including generating a first output signal from a voltage regulator, the first output signal configured to regulate a field current of a generating device associated therewith; and generating a second output signal from the voltage regulator, the second output signal communicated to the vehicle computer, the second output signal further indicative of the state of the first output signal; wherein the second output signal represents an average value of the first output signal, having transient values included within the first output signal filtered therefrom.

In still another embodiment, a storage medium includes a computer readable computer program code for communication of voltage regulator switching information to a vehicle electronic control module, and instructions for causing a computer to implement a method. The method further includes generating a first output signal from a voltage regulator, the first output signal configured to regulate a field current of a generating device associated therewith; and generating a second output signal from the voltage regulator, the second output signal communicated to the vehicle computer, the second output signal further indicative of the state of the first output signal; wherein the second output signal represents an average value of the first output signal, having transient values included within the first output signal filtered therefrom.

In still another embodiment, a voltage regulator for an electrical generator includes an electronic device configured to compare an output voltage of the generator to a desired set point voltage thereof. The electronic device is further configured to generate a first output signal for regulating a field current of the generator, and to generate a second output signal communicated to a vehicle computer, the second output signal further indicative of the state of the first output signal. The second output signal represents an average value of the first output signal, having transient values included within the first output signal filtered therefrom.

In still another embodiment, a vehicle charging system includes an alternator having one or more stator windings on a stationary portion thereof and a field coil on a rotatable portion thereof. A voltage regulator is configured to regulate an output voltage of the alternator through control of a field current through the field coil. The voltage regulator further includes an electronic device configured to generate a first output signal for regulating the field current, and to generate a second output signal communicated to a vehicle computer, the second output signal further indicative of the state of the first output signal. The second output signal represents an average value of the first output signal, having transient values included within the first output signal filtered therefrom.

BRIEF DESCRIPTION OF THE DRAWINGS

Referring to the exemplary drawings wherein like elements are numbered alike in the several Figures.

DETAILED DESCRIPTION

Disclosed herein is a method and system for communicating voltage regulator switching information to a vehicle computer. Briefly stated, a voltage regulator (e.g., microprocessor based) is configured with the capability of generating a first PWM control signal to be applied to the field coil of a vehicle alternator, and a second PWM control signal to be communicated to the vehicle computer. Whereas the first PWM control signal is configured to include transient duty cycle pulses corresponding to changing load conditions, the second PWM control signal is effectively filtered by providing an average PWM signal to the vehicle computer. As a result, the voltage regulator is compatible with those types of ECMs that do not have internal filtering capability therein. Further, when implemented in software, the present techniques do not require more expensive hardware configured within the ECM and/or voltage regulator.

Figure 1:
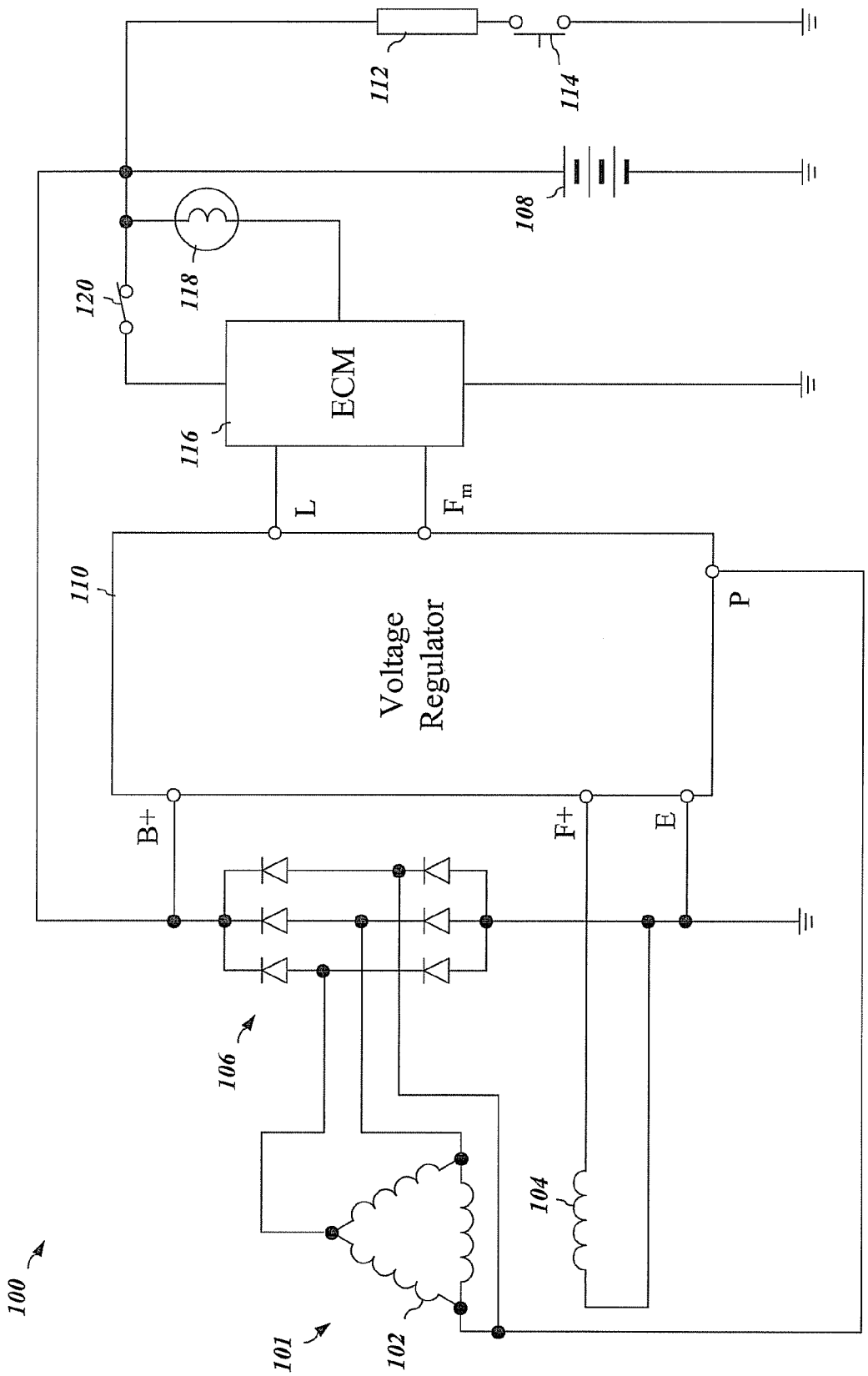
FIG. 1 is a schematic diagram of an exemplary vehicle charging system employing a microprocessor based voltage regulator, suitable for use in accordance with an embodiment of the invention.

Referring initially to FIG. 1, there is shown a schematic diagram of an exemplary vehicle charging system 100 employing a microprocessor based voltage regulator, suitable for use in accordance with an embodiment of the invention. It should be appreciated that although FIG. 1 depicts a vehicle charging system, the present embodiments are applicable to other types of regulated generator systems. A vehicle alternator 101 has a plurality of windings 102 (e.g., three-phase, delta configuration) in a stator portion thereof, and a field coil 104 in a rotor portion thereof. The alternating current (AC) voltage generated in the windings 102 is converted to a direct current (DC) voltage by a full-wave rectifier 106, which in turn includes three diode-pairs configured in parallel. The DC output of the rectifier 106 is fed to the positive terminal of a vehicle battery 108, wherein the magnitude of the output voltage is dependent upon the speed of the rotor and the amount of field current supplied to the field coil 104.

In certain alternator designs, the stator may actually include independent pairs of stator windings and an associated pair of rotor field coils to reduce noise in view of increased load escalation. However, for purposes of simplicity, only one set of stator windings and field coil is illustrated. It will also be appreciated that the windings 102 could alternatively be connected in a Y-configuration having a common neutral point.

As further illustrated in FIG. 1, a voltage regulator 110 is utilized to regulate and control the magnitude of the output voltage generated by the alternator 101, and thus control the (direct current) charging voltage applied to the battery 108 and associated vehicle loads (e.g., load 112 connected through switch 114). It does so by controlling the magnitude of field current supplied to field coil 104 through high-side alternator terminal "F+" shown in FIG. 1. Additional details concerning the generation of current through the field coil 104 by regulator 110 are discussed in further detail hereinafter.

One skilled in the art may also recognize other standardized terminals associated with the alternator, including: the high-side battery output terminal "B+", the phase voltage terminal "P" used to monitor the AC output voltage of the alternator; and the ground terminal "E" used to provide a ground connection for the alternator. An electronic control module 116 (ECM), which may represent the vehicle's main computer, receives a charge warning lamp signal through lamp terminal "L" of the regulator 110, used to control a charge warning lamp 118 when ignition switch 120 is closed. The ECM 116 also receives a rotor switching signal through terminal "$F_m$", indicative of the field current signal F+ applied to the field coil 104.

Figure 2:
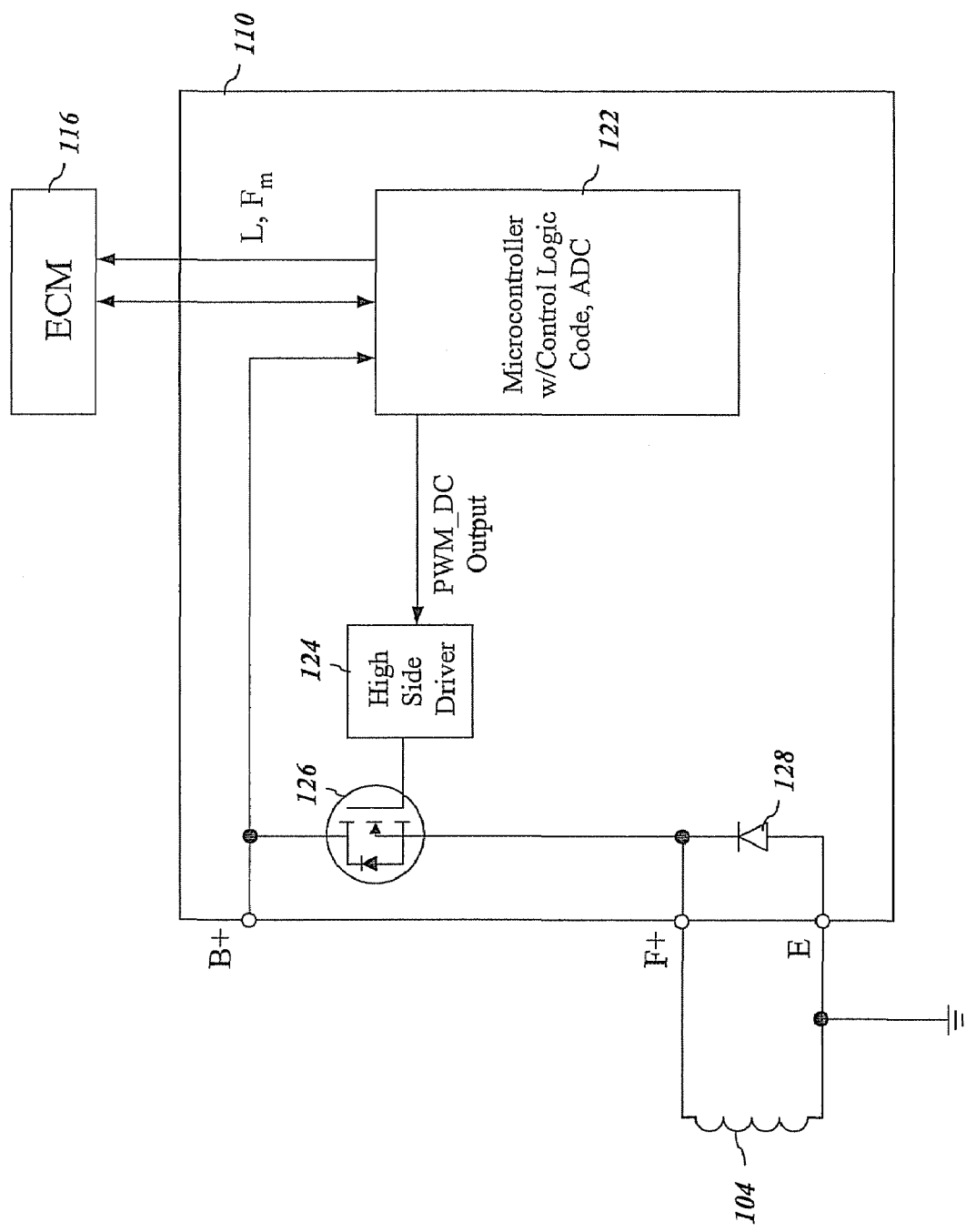
FIG. 2 is a more detailed schematic diagram of the voltage regulator shown in FIG. 1.

Referring now to FIG. 2, a more detailed schematic diagram of at least portions of the voltage regulator 110 of FIG. 1 is illustrated. For purposes of simplification, various discrete electronic components (e.g., resistors, capacitors, etc.) of the regulator 110 are not depicted in FIG. 2. A microcontroller 122 having control logic code therein receives feedback of the alternator charging system voltage(s) in digital form through an internal analog-to-digital converter (ADC) configured therein. Based on a comparison between the sensed system voltage and a predetermined set operating voltage of the system, the microcontroller generates a PWM output signal (PWM_DC) that is coupled to a high-side driver 124. The high-side driver 124 in turn provides a pulsed switching signal to the control terminal (e.g., gate) of transistor 126. Based on the duty cycle of the pulsed signal, the on/off switching of transistor causes field current to intermittently flow through field coil 104. During "off" periods of the duty cycle, energy within the field coil is dissipated through a flyback diode 128.

As indicated above, the regulator 110 attempts to maintain a predetermined charging system voltage level (set point). When the charging system voltage falls below this point, the regulator 110 increases the level of field current by increasing the duty cycle of the PWM_DC current. Conversely, when the charging system voltage increases above the system set point, the 110 decreases the level of field current by decreasing the duty cycle of the PWM_DC current.

Figure 3:
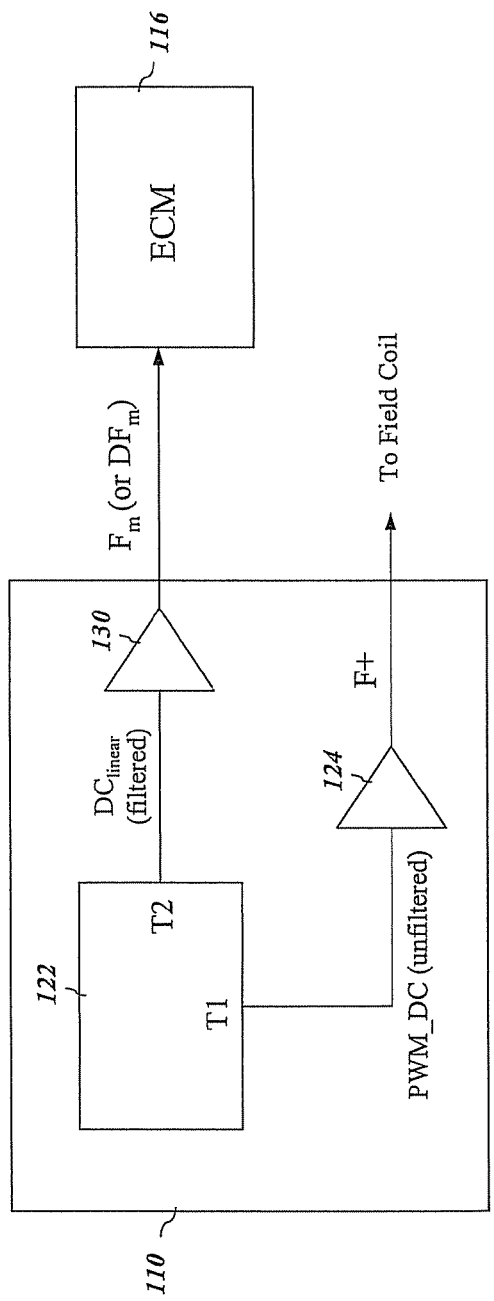
FIG. 3 is a block diagram of the voltage regulator and ECM of FIGS. 1 and 2, illustrating a method for providing regulator switching information to the ECM, in accordance with an embodiment of the invention.

As further indicated above, the PWM_DC signal applied to the high-side driver 124 can include transient pulses (e.g., minimum, maximum duty cycle pulses) that are responsive to varying vehicle load condition. Accordingly, FIG. 3 is a block diagram of the voltage regulator and ECM of FIGS. 1 and 2, illustrating a method for providing regulator switching information to the ECM, in accordance with an embodiment of the invention. In addition to a first PWM output signal (PWM_DC) applied to the high side driver 124, the microcontroller 122 generates a second PWM output signal ($DC_{linear}$) that is communicated to the ECM through a driver device 130 (e.g., a voltage doubler). Unlike the first PWM output signal PWM_DC, the second PWM output signal PWM $DC_{linear}$ represents an average PWM signal, and does not include transient changes in duty cycle pulses. $DC_{linear}$ may, for example, represent an internally computed linear PWM value by the microcontroller 122 that heretofore has not been communicated externally from the microcontroller 122. Thus, although the $F_m$ (or a logically complementary $DF_m$) signal sent to the ECM 116 is generally indicative of the F+ signal applied to the field coil, $F_m$ will represent an average, filtered PWM signal.

Figure 4:
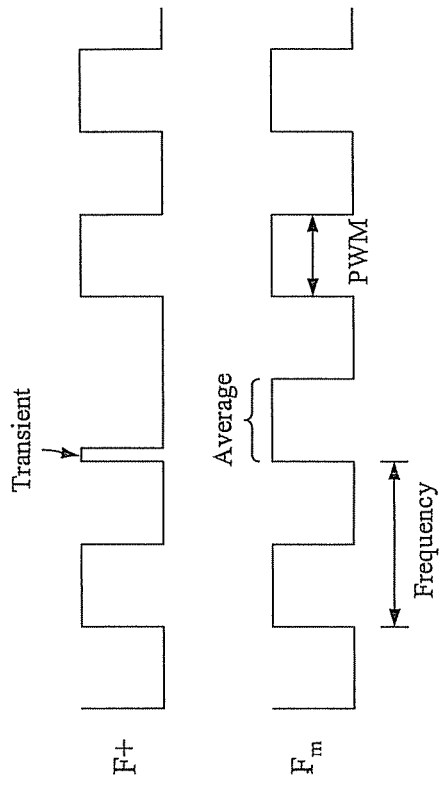
FIG. 4 is a waveform diagram comparing the unfiltered regulator control signal applied to the alternator field coil with the filtered, average PWM control signal communicated to the vehicle ECM.

In an exemplary embodiment, a first timing signal (T1) generated within the microcontroller 122 controls PWM_DC, which in turn drives the alternator field coil signal F+. A second control signal (T2) generated within the microcontroller 122 controls $DC_{linear}$, which in turn drives the average PWM signal communicated to the ECM 116. Finally, FIG. 4 is a waveform diagram comparing the unfiltered regulator control signal F+ applied to the alternator field coil with the filtered, average PWM control signal $F_m$ communicated to the vehicle ECM. The PWM of $F_m$ will be the average of F+, but the frequency of $F_m$ can be programmed for customer requirements. For example, the frequency of F+ may be 400 Hz at 50% duty cycle, while the frequency of $F_m$ could be 100 Hz at 50% duty cycle.

Although the exemplary method outlined above is depicted as being implemented in software within the microcontroller 112, one skilled in the art will also appreciate that the logic can also be implemented through hardware configured within an ASIC type regulator, for instance. In view of the above, the present method embodiments may therefore take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for communicating voltage regulator switching information to a vehicle computer, the method comprising:
   generating a first output signal from a voltage regulator, the first output signal configured to regulate a field current of a generating device associated therewith; and
   generating a second output signal from the voltage regulator, the second output signal communicated to the vehicle computer, the second output signal further indicative of the state of the first output signal;
   wherein the second output signal represents an average value of the first output signal, having transient values included within the first output signal filtered therefrom.

2. The method of claim 1, wherein the first and second output signals further comprise pulse width modulation (PWM) signals.

3. The method of claim 2, wherein the first output signal includes transient PWM pulses therein, the transient pulses responsive to changing load conditions of the generating device.

4. The method of claim 1, wherein the first and second output signals are generated by a microcontroller included within the voltage regulator.

5. The method of claim 4, wherein the microcontroller uses a first timer to generate a first pulse width modulation (PWM) signal representing the first output signal, the first PWM signal including transient pulses responsive to changing load conditions of the generating device, and wherein the microcontroller uses a second timer to generate a second PWM signal representing the second output signal, the second PWM signal comprising an average PWM signal without transient PWM pulses.

6. A storage medium, comprising:
   a computer readable computer program code for implementing communication of voltage regulator switching information to a vehicle electronic control module; and
   instructions for causing a computer to implement a method, the method further comprising:
      generating a first output signal from a voltage regulator, the first output signal configured to regulate a field current of a generating device associated therewith; and
      generating a second output signal from the voltage regulator, the second output signal communicated to the vehicle computer, the second output signal further indicative of the state of the first output signal;
      wherein the second output signal represents an average value of the first output signal, having transient values included within the first output signal filtered therefrom.

7. The storage medium of claim 6, wherein, the first and second output signals further comprise pulse width modulation (PWM) signals.

8. The storage medium of claim 7, wherein the first output signal includes transient PWM pulses therein, the transient pulses responsive to changing load conditions of the generating device.

9. The storage medium of claim 6, wherein the first and second output signals are generated by a microcontroller included within the voltage regulator.

10. The storage medium of claim 9, wherein the microcontroller uses a first timer to generate a first pulse width modulation (PWM) signal representing the first output signal, the first PWM signal including transient pulses responsive to changing load conditions of the generating device, and wherein the microcontroller uses a second timer to generate a second PWM signal representing the second output signal, the second PWM signal comprising an average PWM signal without transient PWM pulses.

11. A voltage regulator for an electrical generator, comprising:
    an electronic device configured to compare an output voltage of the generator to a desired set point voltage thereof, and
    the electronic device further configured to generate a first output signal for regulating a field current of the generator; and
    the electronic device further configured to generate a second output signal communicated to a vehicle computer, the second output signal further indicative of the state of the first output signal;
    wherein the second output signal represents an average value of the first output signal, having transient values included within the first output signal filtered therefrom.

12. The voltage regulator of claim 11, wherein the first and second output signals further comprise pulse width modulation (PWM) signals.

13. The voltage regulator of claim 12, wherein the first output signal includes transient PWM pulses therein, the transient pulses responsive to changing load conditions of the generating device.

14. The voltage regulator of claim 11, wherein the electronic device further comprises a microcontroller.

15. The voltage regulator of claim 14, wherein the microcontroller further comprises:
    a first timer configured to generate a first pulse width modulation (PWM) signal representing the first output signal, the first PWM signal including transient pulses responsive to changing load conditions of the generating device; and
    a second timer configured to generate a second PWM signal representing the second output signal, the second PWM signal comprising an average PWM signal without transient PWM pulses.

16. A vehicle charging system, comprising:
    an alternator having one or more stator windings on a stationary portion thereof and a field coil on a rotatable portion thereof;

a voltage regulator configured to regulate an output voltage of the alternator through control of a field current through the field coil, the voltage regulator further comprising:
- an electronic device configured to generate a first output signal for regulating the field current; and
- the electronic device further configured to generate a second output signal communicated to a vehicle computer, the second output signal further indicative of the state of the first output signal;
- wherein the second output signal represents an average value of the first output signal, having transient values included within the first output signal filtered therefrom.

17. The vehicle charging system of claim 16, wherein the first and second output signals further comprise pulse width modulation (PWM) signals.

18. The vehicle charging system of claim 17, wherein the first output signal includes transient PWM pulses therein, the transient pulses responsive to changing load conditions of the generating device.

19. The vehicle charging system of claim 18, wherein the electronic device further comprises a microcontroller.

20. The vehicle charging system of claim 19, wherein the microcontroller further comprises:
- a first timer configured to generate a first pulse width modulation (PWM) signal representing the first output signal, the first PWM signal including transient pulses responsive to changing load conditions of the generating device; and
- a second timer configured to generate a second PWM signal representing the second output signal, the second PWM signal comprising an average PWM signal without transient PWM pulses.

* * * * *